United States Patent
Morishima (10) Patent No.: US 11,940,655 B2
(45) Date of Patent: Mar. 26, 2024

(54) OPTICAL CONNECTOR AND OPTICAL CONNECTION STRUCTURE

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 359 days.

(21) Appl. No.: 17/367,810

(22) Filed: Jul. 6, 2021

(65) Prior Publication Data
US 2021/0333483 A1    Oct. 28, 2021

Related U.S. Application Data

(63) Continuation of application No. PCT/JP2020/000878, filed on Jan. 14, 2020.

(30) Foreign Application Priority Data

Jan. 15, 2019    (JP) ................. 2019-004071

(51) Int. Cl.
*G02B 6/38*    (2006.01)

(52) U.S. Cl.
CPC ......... *G02B 6/3875* (2013.01); *G02B 6/3821* (2013.01); *G02B 6/3825* (2013.01); *G02B 6/3833* (2013.01); *G02B 6/3869* (2013.01); *G02B 6/3885* (2013.01); *G02B 6/3893* (2013.01); *G02B 6/3897* (2013.01)

(58) Field of Classification Search
CPC .. G02B 6/3821; G02B 6/3825; G02B 6/3833; G02B 6/3854; G02B 6/3869; G02B 6/3875; G02B 6/3885; G02B 6/3893; G02B 6/3897
See application file for complete search history.

(56) References Cited

U.S. PATENT DOCUMENTS

| 2002/0186931 A1 | 12/2002 | Seo et al. |
| 2002/0191919 A1 | 12/2002 | Nolan |
| 2017/0307831 A1 | 10/2017 | Katagiyama et al. |

FOREIGN PATENT DOCUMENTS

| JP | H08-094879 A | 4/1996 | |
| JP | H0894879 A * | 4/1996 | ............... G02B 6/38 |
| JP | 2002-318324 A | 10/2002 | |
| WO | 2016/103821 A1 | 6/2016 | |

OTHER PUBLICATIONS

Sakaime et al.; "MU-Type Multi-core fiber connector;" IEICE Communication Society Conference, B-13-9, Sep. 2012.

* cited by examiner

*Primary Examiner* — Michael P Mooney
(74) *Attorney, Agent, or Firm* — Oliff PLC (57) ABSTRACT

This optical connector includes a ferrule, a plug frame, and an elastic member. The ferrule holds a glass fiber of an optical fiber. The plug frame receives the ferrule. The elastic member holds, with a first length, the ferrule in a first position in the plug frame, or holds, with a second length shorter than the first length, the ferrule in a second position in the plug frame. When the ferrule is in the first position, the ferrule and the plug frame are in contact with each other via the tapered surface, and the pivotal movement of the ferrule to the plug frame is restricted. When the ferrule is in the second position, the ferrule is not in contact with the plug frame and is pivotable to the plug frame, and the ferrule is in a floating state.

7 Claims, 9 Drawing Sheets

OPTICAL CONNECTOR AND OPTICAL CONNECTION STRUCTURE

CROSS-REFERENCE TO RELATED APPLICATION

The present application is a continuation application of International Application No. PCT/JP2020/000878 filed on Jan. 14, 2020 which claims priority from Japanese Patent Application No. 2019-004071 filed on Jan. 15, 2019. The entire contents of the earlier application are incorporated herein by reference.

TECHNICAL FIELD

The present disclosure relates to an optical connector and an optical connection structure.

BACKGROUND ART

An optical connector includes a ferrule that holds an optical fiber, and a plug frame that receives the ferrule. It is required to maintain an optical connection state between cores of each optical fiber even when an external force is applied to the plug frame. Non-Patent Literature 1 discloses a structure in which a ferrule is floated with respect to a plug frame so that an external force applied to the plug frame (plug housing) does not act on the ferrule. This structure adopts the Oldham coupling mechanism. A coupling component is interposed between a flange provided in the ferrule and the plug frame, the ferrule is movable in one direction (left-right direction) perpendicular to a central axis of the ferrule with respect to the coupling component, and the coupling component is movable in a direction (upper-lower direction) perpendicular to the central axis of the ferrule and the one direction with respect to the plug frame.

CITATION LIST

Non-Patent Literature

Non-Patent Literature 1: Sakaime et al., "MU-type Multicore Fiber Connector", IEICE Communication Society Conference, B-13-9, September 2012

SUMMARY

An optical connector according to an aspect of the present disclosure includes a ferrule, a plug frame, and an elastic member. The ferrule is provided with a flange on the outside, has a through hole on the inside, and is configured to hold a glass fiber exposed from a resin coating covering the glass fiber at one end portion of an optical fiber containing the glass fiber and the resin coating in the through hole. The plug frame is configured to receive the ferrule. The elastic member biases the ferrule along a central axis direction of the ferrule. The elastic member is configured to hold, when the elastic member has a first length of the elastic member, the ferrule in a first position in the plug frame, and hold, when the elastic member has a second length shorter than the first length, the ferrule in a second position in the plug frame.

At least one of the ferrule and the plug frame has at least one tapered surface whose distance with a central axis of the ferrule decreases toward a biasing direction of the elastic member. When the ferrule is in the first position, the ferrule and the plug frame are in contact with each other via the at least one tapered surface, and pivotal movement of the ferrule with respect to the plug frame is restricted. When the ferrule is in the second position, the ferrule is not in contact with the plug frame and is pivotable with respect to the plug frame, and the ferrule is in a floating state with respect to the plug frame.

DESCRIPTION OF EMBODIMENTS

Problems to be Solved by Invention

In the structure according to Non-Patent Literature 1, the flange is divided into a plurality of parts and moved in the upper-lower direction and the left-right direction, so that the number of components of the optical connector is increased and the structure is complicated, and therefore, it is difficult to reduce the manufacturing cost of the optical connector.

First, the contents of embodiments of the present disclosure will be listed and described.

(1) An optical connector according to an aspect of the present disclosure includes a ferrule, a plug frame, and an elastic member. The ferrule is provided with a flange on the outside, has a through hole on the inside, and is configured to hold a glass fiber exposed from a resin coating covering the glass fiber at one end portion of an optical fiber containing the glass fiber and the resin coating in the through hole. The plug frame is configured to receive the ferrule. The elastic member biases the ferrule along a central axis direction of the ferrule. The elastic member is configured to hold, when the elastic member has a first length of the elastic member, the ferrule in a first position in the plug frame, and hold, when the elastic member has a second length shorter than the first length, the ferrule in a second position in the plug frame.

At least one of the ferrule and the plug frame has at least one tapered surface whose distance to a central axis of the ferrule decreases toward a biasing direction of the elastic member. When the ferrule is in the first position, the ferrule and the plug frame are in contact with each other via the at least one tapered surface, and pivotal movement of the ferrule with respect to the plug frame is restricted. When the ferrule is in the second position, the ferrule is not in contact with the plug frame and is pivotable with respect to the plug frame, and the ferrule is in a floating state with respect to the plug frame.

In such an optical connector, the ferrule and the plug frame are in a contact state until the ferrule is moved from the first position to the second position, so that the ferrule is positioned with respect to the plug frame, and the pivotal movement is also restricted. On the other hand, after the ferrule is moved from the first position to the second position, the contact state between the ferrule and the plug frame is released, and the ferrule is floated with respect to the plug frame, so that even if an external force is applied to the plug frame, the external force is not transmitted to the ferrule. In this way, the state in which the ferrule is positioned with respect to the plug frame and the floating state are implemented only by the tapered surface, the number of components of the optical connector can be reduced, and the structure of the optical connector can be simplified. In addition, a height of the ferrule or a height and a width of the plug frame are gradually reduced toward the biasing direction, so that the ferrule can be easily inserted from the rear of the front housing. When the ferrule is further moved forward in the biasing direction, a gap between the ferrule and the plug frame is reduced, so that positioning of the ferrule with respect to the plug frame is facilitated.

(2) In the optical connector, the at least one tapered surface includes a first tapered surface and a second tapered surface. The first tapered surface and the second tapered surface are configured to face each other so that the central axis of the ferrule is interposed therebetween. As a result, the pivotal movement between the plug frame and the ferrule at the first position is more reliably prevented.

(3) In the optical connector, the flange of the ferrule has a polygonal shape in a cross-sectional view. As a result, the pivotal movement between the plug frame and the ferrule at the first position is reliably prevented.

(4) In the optical connector, the flange of the ferrule has a quadrangular shape in a cross-sectional view. As a result, the manufacture of the ferrule with the flange can be facilitated.

(5) In the optical connector, the ferrule is made of zirconia. As a result, it is possible to prevent reflection at the end face of the ferrule as compared with a ferrule made of metal.

(6) The optical fiber to be held by the ferrule is any one of a multicore fiber, a polarization maintaining fiber, and a bundle fiber. As a result, even when a polarization maintaining fiber a bundle fiber, or the multicore fiber is used, it is possible to reliably perform positioning, and thus connection loss can be reduced.

An optical connection structure according to an aspect of the present disclosure is (7) an optical connection structure including: an optical connector assembly in which an optical fiber is assembled in the optical connector; and a connection object coupled to the optical connector assembly via a sleeve. The optical fiber and an optical fiber in the connection object are optically connected to each other. When the ferrule is inserted into the sleeve and the ferrule is in the second position, the ferrule is in a floating state with respect to the plug frame. As a result, the ferrule is positioned with respect to the plug frame until the optical connector assembly and the connection object are coupled to each other, and the pivotal movement is also prevented. On the other hand, since the ferrule is held by the plug frame only via the elastic member after the optical connector and the connection object are coupled (also referred to as at the time of connector connection), the optical connection state between the optical fiber in the connector assembly and the optical fiber in the connection object can be maintained even if an external force is applied to the plug frame. Therefore, it is possible to provide an optical connection structure that is simple in structure and easy to maintain an optical connection state.

[Effects of Present Disclosure]

According to the optical connector of the present disclosure, the number of components is reduced, and the structure is simplified.

[Embodiments of Present Disclosure]

Hereinafter, embodiments relating to an optical connector and an optical connection structure according to the present disclosure will be described with reference to the drawings. In the following description, configurations denoted by the same reference numerals in different drawings are the same, and description thereof may be omitted. It should be noted that the present disclosure is not limited to the examples in these embodiments, and includes all modifications within the scope of the matters described in the claims and within the equivalent scope. In addition, the present disclosure includes a combination of any embodiments as long as a plurality of embodiments can be combined.

[Example of Optical Connector according to Present Disclosure]

Figure 1:
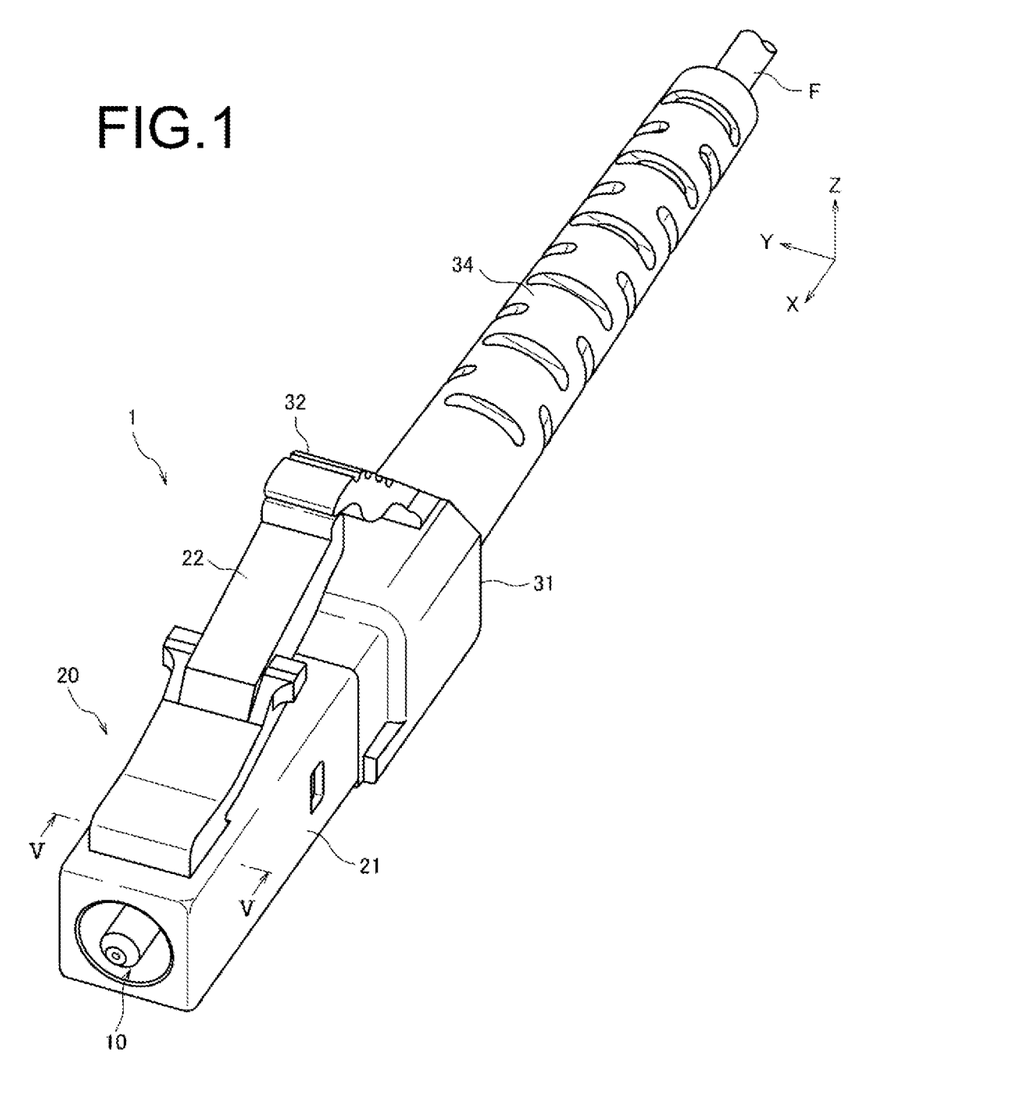
FIG. 1 is an external perspective view illustrating an optical connector according to one aspect of the present disclosure in a state in which an optical fiber is assembled.
Figure 2:
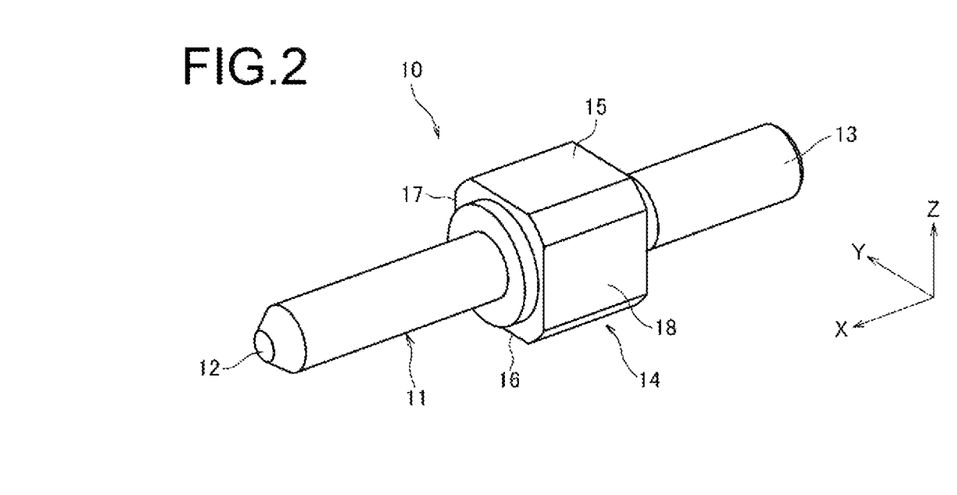
FIG. 2 is a perspective view of a ferrule included in the optical connector of FIG. 1.
Figure 3:
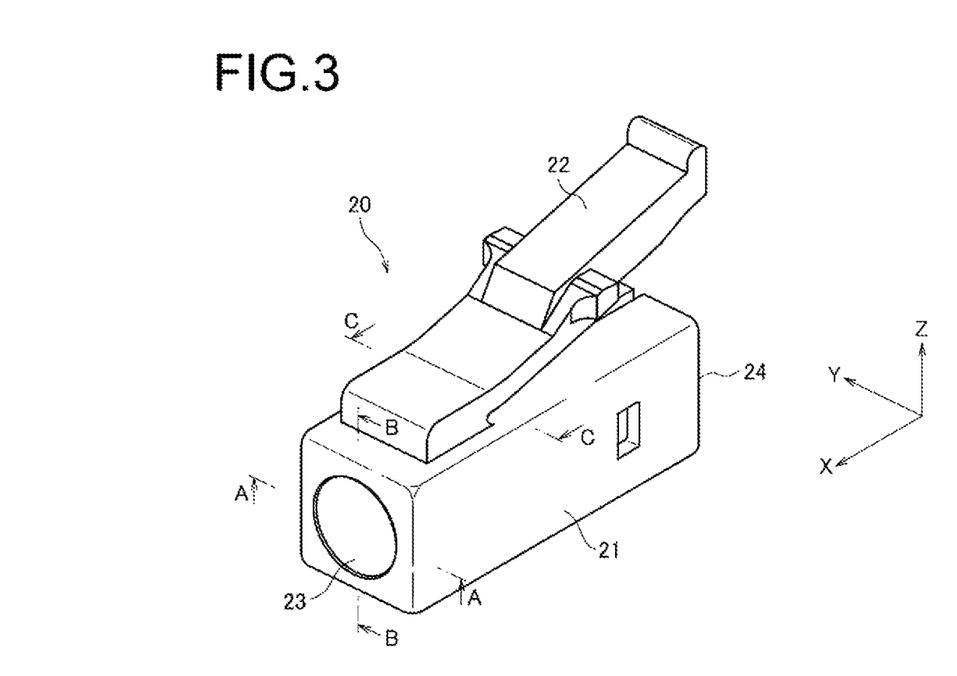
FIG. 3 is a perspective view of a front housing configuring a plug frame of the optical connector of FIG. 1.
Figure 4A:
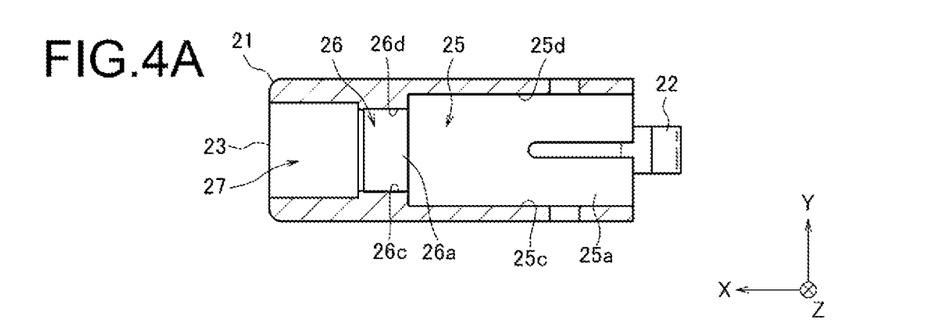
FIG. 4A is a sectional view taken along a line A-A of FIG. 3.
Figure 4B:
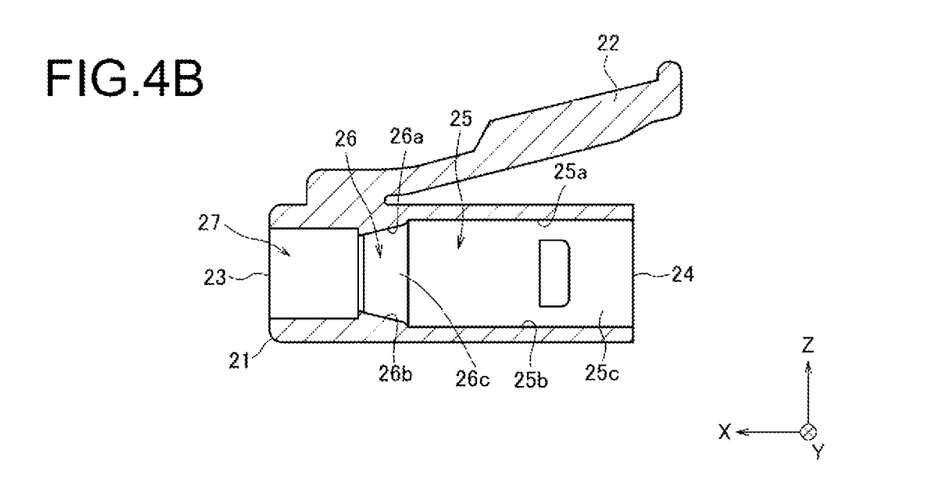
FIG. 4B is a sectional view taken along a line B-B of FIG. 3.
Figure 4C:
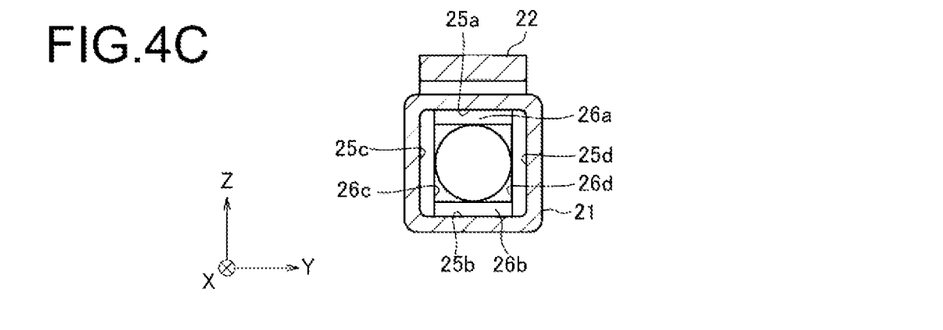
FIG. 4C is a sectional view taken along a line C-C of FIG. 3.
Figure 5:
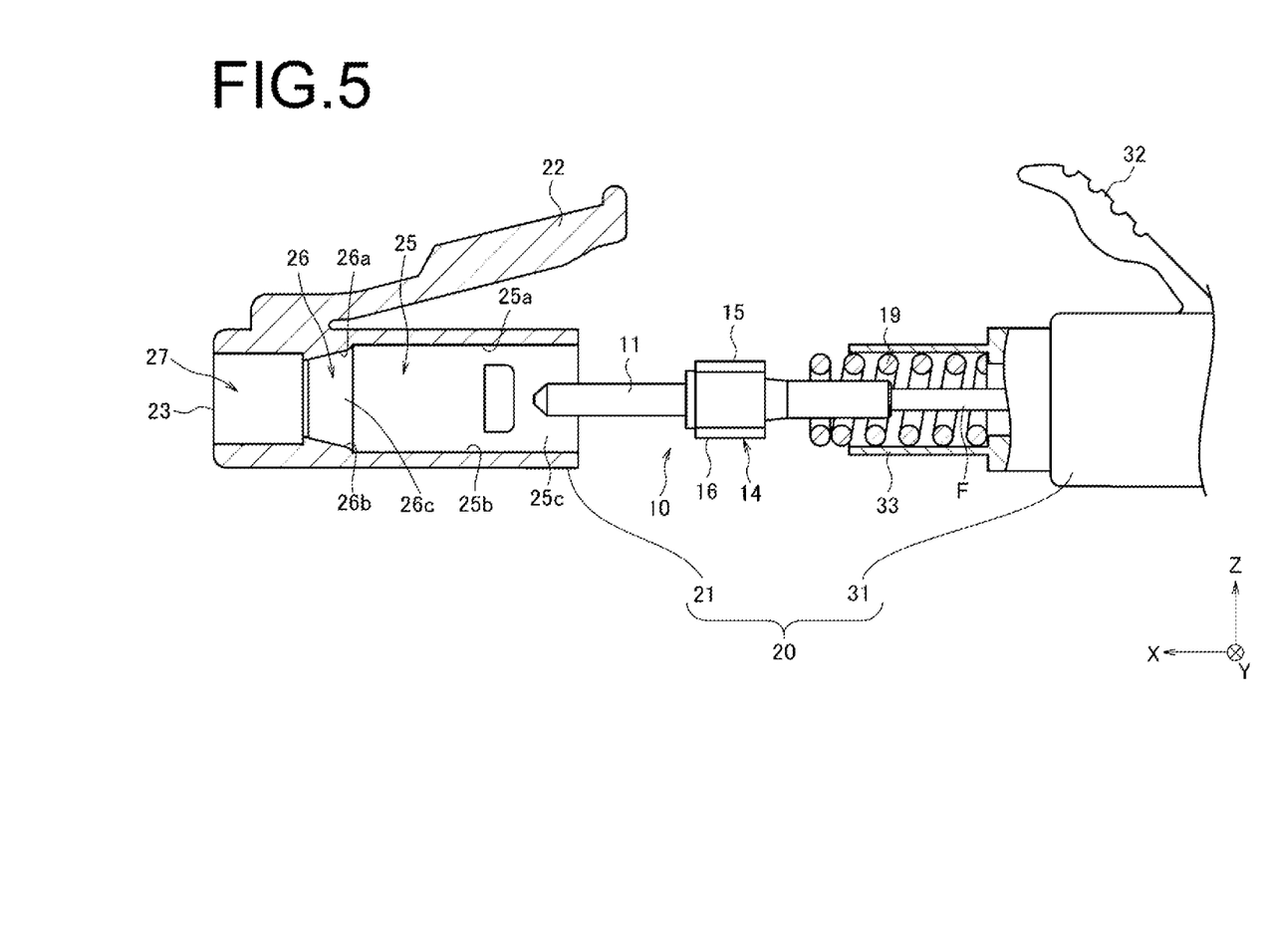
FIG. 5 is a sectional view showing a state before the ferrule is received in the plug frame.

FIG. 1 is an external perspective view illustrating an optical connector 1 according to one aspect of the present disclosure in a state in which an optical fiber is incorporated. FIG. 2 is a perspective view of a ferrule 10 included in the optical connector 1, and FIG. 3 is a perspective view of a front housing 21 configuring a plug frame 20 of the optical connector 1. FIG. 4A is a sectional view taken along a line A-A of FIG. 3, FIG. 4B is a sectional view taken along a line B-B of FIG. 3, and FIG. 4C is a sectional view taken along a line C-C of FIG. 3. FIG. 5 is a sectional view showing a state before the ferrule 10 is received in the plug frame 20. Hereinafter, the optical connector will be described using an LC connector as an example.

As shown in FIG. 1, the optical connector 1 includes the plug frame 20 that receives the ferrule 10, and a boot 34 that protects an optical fiber F is provided at a rear end of the plug frame 20.

[Ferrule]

As shown in FIG. 2, the ferrule 10 has a ferrule main body 11 extending in the X-axis direction shown in the figure. The ferrule main body 11 is made of, for example, zirconia and has a cylindrical shape, and has a through hole inside the ferrule main body 11. A glass fiber exposed from a resin coating of a tip end portion (one end portion) of the optical fiber F is held in the through hole. The optical fiber F is, for example, a multicore fiber having a plurality of cores, and is inserted from a rear end 13 of the ferrule main body 11, so as to be fixed to the ferrule 10 in a state where a front end surface is exposed from a front end 12, and the plurality of cores are arranged at predetermined positions around a central axis of the ferrule 10. A direction of an axis of the through hole is indicated by an X axis in the drawings. Hereinafter, the direction of the through hole is also referred to as an optical axis direction of the optical fiber F.

A flange 14 made of, for example, metal is provided on the outside of the ferrule main body 11 at a substantially central position of the ferrule main body 11. The flange 14 has, for example, a substantially polygonal shape (a substantially quadrangular shape in FIG. 2) in a cross-sectional view, and has an upper surface 15, a lower surface (flat surface) 16, a left side surface 17, and a right side surface 18 that form an outer peripheral surface of the flange 14. The upper surface 15 and the lower surface 16 face each other so that the optical axis of the optical fiber F is interposed therebetween, and are flat surfaces parallel to each other at a predetermined distance in a Z-axis direction shown in the drawing. The left side surface 17 and the right side surface 18 are orthogonal to the upper surface 15 and the lower surface 16 and face each other so that the optical axis of the optical fiber F is interposed therebetween, and are flat surfaces parallel to each other at a predetermined distance in a Y-axis direction shown in the drawing. Boundary positions between the upper surface 15 and the left side surface 17 and between the upper surface 15 and the right side surface 18, as well as boundary positions between the lower surface 16 and the left side surface 17 and between the lower surface 16 and the right side surface 18 are chamfered. If a mark (not shown) for indicating a reference of a rotation position is provided on the upper surface 15, the ferrule 10 is insertable into the plug frame 20 in a correct orientation.

[Front Housing of Plug Frame]

As shown in FIG. 3, the plug frame 20 has a rectangular tubular front housing 21 extending in the X-axis direction shown in the drawing. The front housing 21 is made of, for example, resin, and has a rear end opening 24 that can accept the ferrule 10 with the flange 14, and a front end opening 23 from which the front end 12 of the ferrule main body 11 described with reference to FIG. 2 protrudes. A latch arm 22 having flexibility is provided on an outer peripheral surface of the front housing 21.

As shown in FIGS. 4A to 4C, the inside of the front housing 21 is divided into a clearance portion 25 closest to the rear end opening 24 side (a negative direction of the X axis in the drawing, the same applies hereinafter), a pivotal movement restricting portion 26 in front of the clearance portion 25, and a substantially rectangular tubular opening portion 27 in front of the pivotal movement restricting portion 26.

The clearance portion 25 does not engage with the flange 14 of the ferrule 10, and has an upper surface 25a, a lower surface 25b, a left side surface 25c, and a right side surface 25d as shown in FIGS. 4A to 4C. The upper surface 25a and the lower surface 25b are parallel to each other at a predetermined distance in the Z-axis direction shown in the drawing, and the left side surface 25c and the right side surface 25d are parallel to each other at a predetermined distance in the Y-axis direction shown in the drawing. Therefore, the clearance portion 25 is a rectangular tubular internal space formed by the upper surface 25a, the lower surface 25b, the left side surface 25c, and the right side surface 25d, and a distance from the upper surface 25a to the lower surface 25b (a length in the Z-axis direction in the drawing, the same applies hereinafter) is larger than a thickness of the flange 14 (a distance between the upper surface 15 and the lower surface 16). As a result, the ferrule 10 with the flange 14 can float when the flange 14 is in the clearance portion 25.

As shown in FIGS. 4A to 4C, the pivotal movement restricting portion 26 has tapered surfaces that restrict the pivotal movement of the ferrule 10 (a first tapered surface 26a and a second tapered surface 26b), a left side surface 26c, and a right side surface 26d. The first tapered surface 26a and the second tapered surface 26b, which are the tapered surfaces, face each other at a distance with the optical axis in the Z-axis direction shown in the drawing, and the left side surface 26c and the right side surface 26d are parallel to each other at a predetermined distance in the Y-axis direction shown in the drawing.

More specifically, a distance between the first tapered surface 26a and the optical axis and a distance between the second tapered surface 26b and the optical axis decrease in a biasing direction of a coil spring 19. The coil spring 19 will be described later. A distance in the Z-axis direction between a front end of the first tapered surface 26a and a front end of the second tapered surface 26b becomes smaller than the thickness of the flange 14 of the ferrule 10 (the distance between the upper surface 15 and the lower surface 16), and a distance in the Z-axis direction between a rear end of the first tapered surface 26a and a rear end of the second tapered surface 26b is larger than the thickness of the flange 14 of the ferrule 10 (the distance between the upper surface 15 and the lower surface 16).

In this way, since the distance between the upper surface and the lower surface in the front housing 21 is gradually shortened from the clearance portion 25 toward the pivotal movement restricting portion 26, the ferrule 10 can be easily inserted from the rear of the front housing 21, and the ferrule 10 can be easily positioned with respect to the front housing 21.

[Rear Housing of Plug Frame]

As shown in FIG. 5, the plug frame 20 includes a rear housing 31 behind the front housing 21. The rear housing 31 is made of, for example, resin, and includes a cylindrical spring receiving portion 33 capable of receiving a rear end part of the ferrule 10 and the coil spring (elastic member) 19. The coil spring 19 is disposed behind the ferrule 10, abuts against a rear end of the flange 14, and biases the ferrule 10 forward (a positive direction of the X axis in the drawing, the same applies hereinafter).

A clip 32 that can be engaged with the latch arm 22 is provided on an outer peripheral surface of the rear housing 31. The rear end part of the ferrule 10 and the coil spring 19 are received in the rear housing 31, and a front end part of the ferrule 10 is inserted into the front housing 21. The flange 14 can be placed on the lower surface 25b of the front housing 21 at the position of the clearance portion 25.

Figure 6:
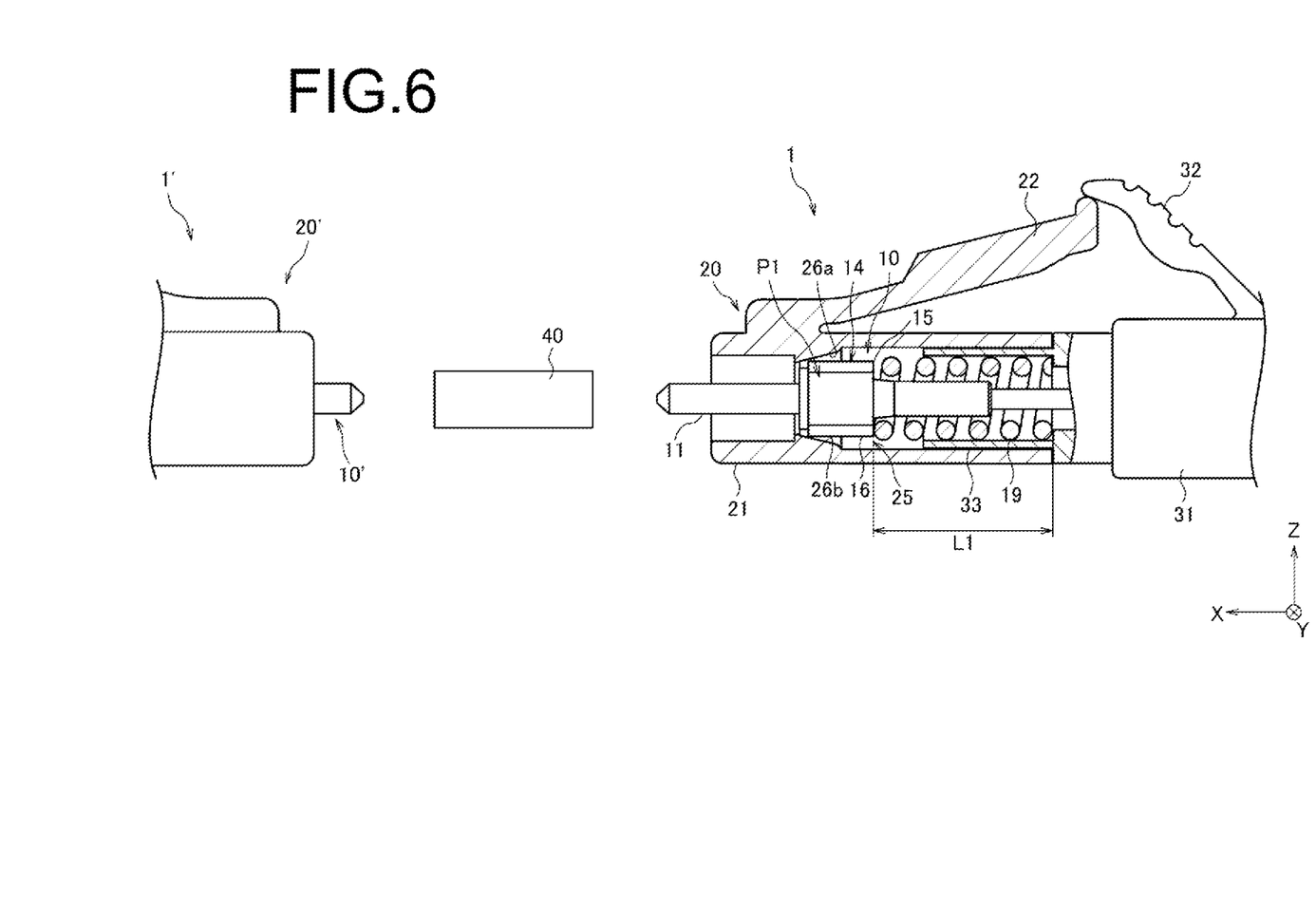
FIG. 6 is a sectional view showing a state after the ferrule is received in the plug frame.

Next, when the clip 32 rides on the latch arm 22, the front housing 21 is latched by the rear housing 31. At the same time, the flange 14 is pushed forward by a biasing force of the coil spring 19, and the upper surface 15 of the flange 14 moves forward along the first tapered surface 26a of the front housing 21 or the lower surface 16 of the flange 14 moves forward along the second tapered surface 26b of the front housing 21. As the flange 14 is moved forward, as shown in FIG. 6, when the upper surface 15 of the flange 14 comes into contact with the first tapered surface 26a of the front housing 21, or the lower surface 16 of the flange 14 comes into contact with the second tapered surface 26b of the front housing 21 (hereinafter, the position of the ferrule 10 in the plug frame 20 at this time is referred to as a "first position P1"), the front end 12 of the ferrule 10 protrudes from the front housing 21. At this time, the flange 14 is held between the first tapered surface 26a and the second tapered surface 26b of the front housing 21, and the flange 14 is held at the first position P1 in a state where the pivotal movement of the flange 14 with respect to the front housing 21 is restricted and the flange 14 is difficult to move in the Z-axis direction. A length of the coil spring 19 at this time is referred to as a first length L1.

[Example of Optical Connection Structure According to Present Disclosure]

Next, as shown in FIG. 6, an optical connection structure includes the optical connector 1 and another optical connector 1', and the optical fiber F on the optical connector 1 side and an optical fiber F' (not shown) on the optical connector 1' side are optically connected using a split sleeve (sleeve) 40. The optical fiber F' is also a multicore fiber having a plurality of cores, and is fixed to a ferrule 10' in a state where the plurality of cores are arranged at predetermined positions around a central axis of the ferrule 10'. Although not shown in a cross-sectional view, the optical connector (connection object) 1' is configured in the same manner as the optical connector 1, and has the ferrule 10' holding the optical fiber F' and an elastic member (not shown) biasing the ferrule 10' in a plug frame 20'.

The split sleeve 40 has an inner diameter substantially equal to a diameter of the ferrules 10 and 10' or slightly smaller than the diameter of the ferrules 10 and 10'. The split sleeve 40 has a slit (not shown), and the slit can be widened to increase the inner diameter. Note that the split sleeve 40 may be incorporated in an adapter (a component that connects the same type or different types of connectors, for example, http://www.optigate.jp/products/connector/adapter.html).

Figure 7:
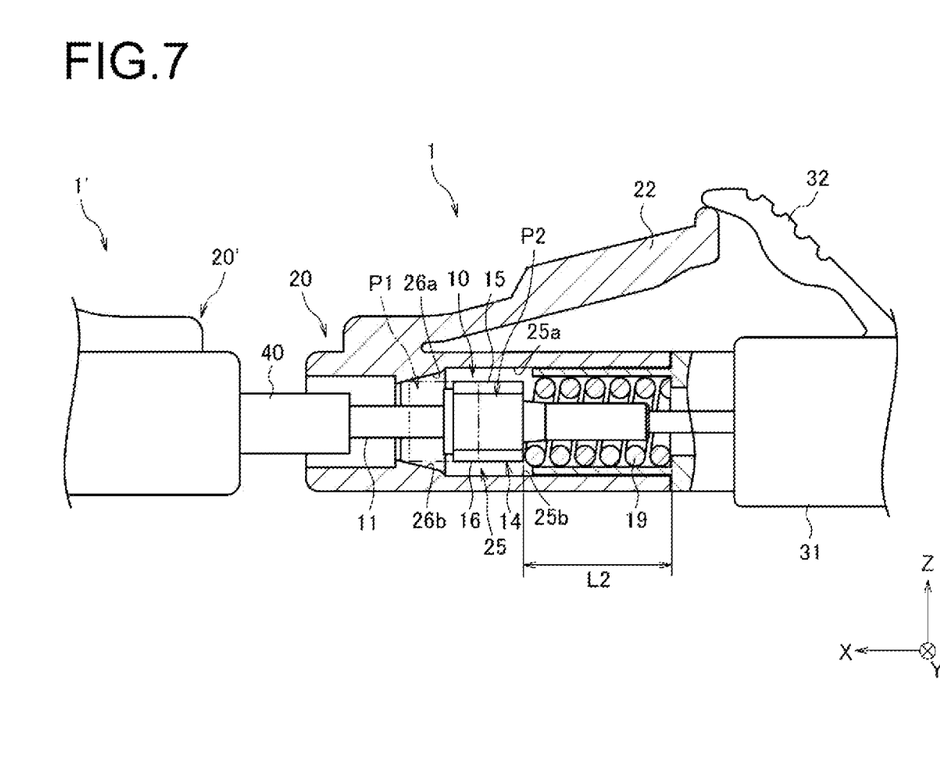
FIG. 7 is a sectional view showing a state after a split sleeve is mounted on the ferrule.

The ferrule 10 shown in FIG. 6 is inserted from one end of the split sleeve 40, the ferrule 10' is inserted from the other end of the split sleeve 40, and an end face of the optical fiber F on the ferrule 10 side and an end face of the optical fiber F' on the ferrule 10' side are brought into surface contact with each other in the split sleeve 40 (also referred to as connector connection). As shown in FIG. 7, when the split sleeve 40 enters the front housing 21 and the ferrule 10 moves to a second position P2 behind the first position P1 (that is, when the coil spring 19 has a second length L2 shorter than the first length L1), the flange 14 moves rearward against the biasing force of the coil spring 19, and therefore, a contact state between the tapered surfaces (the first tapered surface 26a and the second tapered surface 26b) of the front housing 21 and the upper surface 15 and the lower surface 16 of the flange 14 is released. At this time, the ferrule 10 is held at the second position P2 in the plug frame 20 by the split sleeve 40 and the coil spring 19.

Then, when the flange 14 reaches the position of the clearance portion 25, the ferrule 10 is not positioned with respect to the front housing 21 and is in a floating state, so that the ferrule 10 can move in any of the X-axis, Y-axis, and Z-axis directions, and can rotate around the optical axis together with the optical fiber F' on the optical connector 1' side.

In this way, until the optical connector 1 and the optical connector 1' are coupled (until the ferrule 10 is moved from the front to the rear), the upper surface 15 and the lower surface 16 of the flange 14 are in contact with the tapered surfaces (the first tapered surface 26a and the second tapered surface 26b) of the front housing 21, so that the ferrule 10 is positioned with respect to the front housing 21 and the pivotal movement is also prevented. Therefore, by causing the plug frame 20 to face the plug frame 20', each of the plurality of cores included in the optical fiber F and each of the plurality of cores included in the optical fiber F' can accurately face each other.

On the other hand, after the optical connector 1 and the optical connector 1' are coupled (after the ferrule 10 is moved to the rear: at the time of connector connection), the contact state between the upper surface 15 and the lower surface 16 of the flange 14 and the tapered surfaces (the first tapered surface 26a and the second tapered surface 26b) of the front housing 21 is released, and the ferrule 10 is floated with respect to the front housing 21, so that even if an external force is applied to the front housing 21 or the rear housing 31, the external force is not transmitted to the ferrule 10, and the optical connection state by the optical fiber F and the optical fiber F' can be maintained.

In this way, the state in which the ferrule 10 is positioned with respect to the front housing 21 and the floating state are implemented only by the configuration of the upper surface 15 and the lower surface 16 of the flange 14 and the tapered surfaces (the first tapered surface 26a and the second tapered surface 26b) of the front housing 21, the number of components of the optical connector 1 can be reduced, and the structure of the optical connector 1 can be simplified. As a result, it is possible to provide an optical connection structure that is simple in structure and easy to maintain an optical connection state.

In the above embodiment, when the upper surface 15 and the lower surface 16 of the flange 14 are in contact with the tapered surfaces (the first tapered surface 26a and the second tapered surface 26b) of the front housing 21, the upper surface 15 and the lower surface 16 of the flange 14 are held by the tapered surfaces (the first tapered surface 26a and the second tapered surface 26b) of the front housing 21.

However, the present disclosure is not limited to this example, and the tapered surface of the front housing 21 may be provided on the side surface.

That is, a surface serving as the first tapered surface 26a and a surface serving as the second tapered surface 26b may be simply flat surfaces, the left side surface 26c may be the first tapered surface, and the right side surface 26d may be the second tapered surface.

In addition, in the above embodiment, the optical connector is described using an LC connector as an example, but the present disclosure can also be applied to other types of optical connectors including, for example, an SC connector and an MU connector.

Further, the optical fiber F is described using a multicore fiber as an example.

However, the optical fiber of the present disclosure may be, for example, a single mode fiber, a polarization maintaining fiber, or a bundle fiber.

The multicore fiber, the polarization maintaining fiber, and the bundle fiber are optical fibers that require adjustment of a rotation angle around a central axis when being optically connected.

The bundle fiber is a fiber in which a plurality of single-core fibers are collected so as to be optically connected to the multicore fiber.

Figure 8:
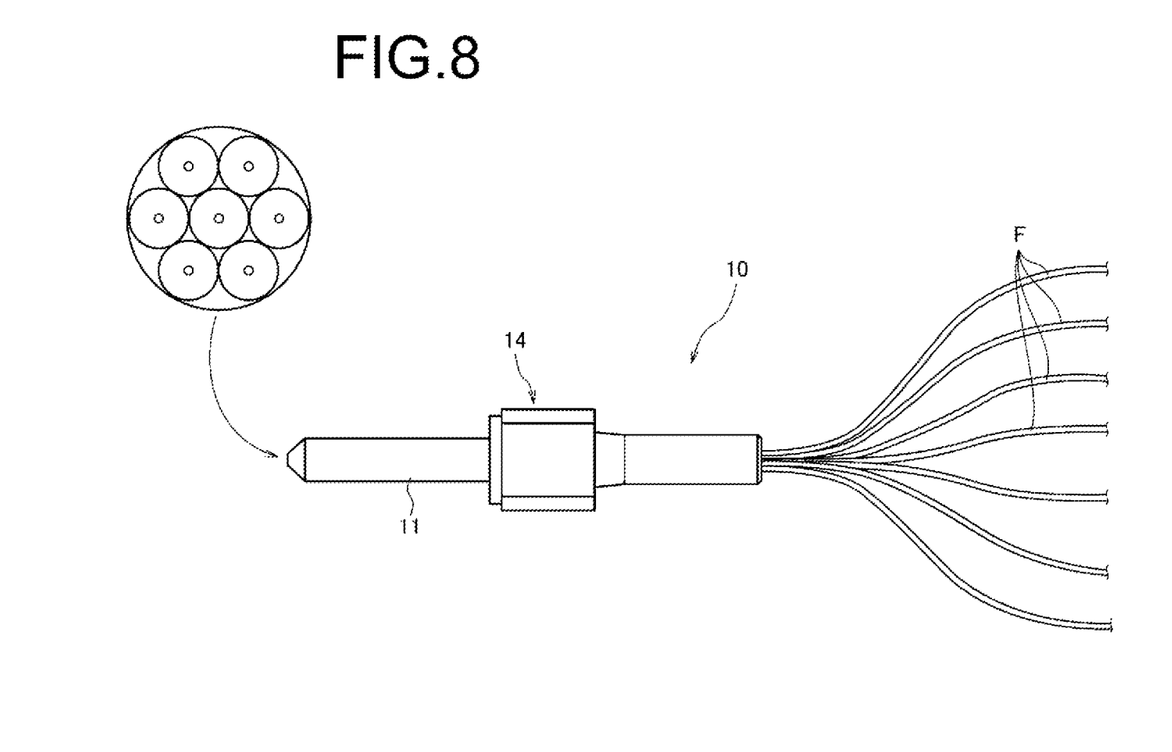
FIG. 8 is a diagram for illustrating a bundle fiber.

Specifically, for example, a single-core fiber having a glass diameter of 125 µm is prepared by chemically etching a tip of the single-core fiber to reduce the diameter of the single-core fiber to, for example, a glass diameter of 45 µm, and a plurality of (for example, seven) single-core fibers are collectively inserted into the ferrule 10 with an adhesive as shown in FIG. 8. In the case of this example, the cores can be arranged such that a distance therebetween is 45 µm. In this way, even when a multicore fiber, a polarization maintaining fiber, or a bundle fiber is used in addition to the single mode fiber, it is possible to reliably perform positioning, and thus connection loss can be reduced.

Other Embodiments

In the above embodiment, an example of the optical connector 1 including the ferrule 10 having the flange 14 with a substantially quadrangular shape in a cross-sectional view and the plug frame 20 having the front housing 21 having the tapered surfaces is described. However, in the optical connector according to the present disclosure, the ferrule may have a tapered surface, and the inside of the front housing of the plug frame may be a flat surface, which will be specifically described below.

[Ferrule]

Figure 9A:
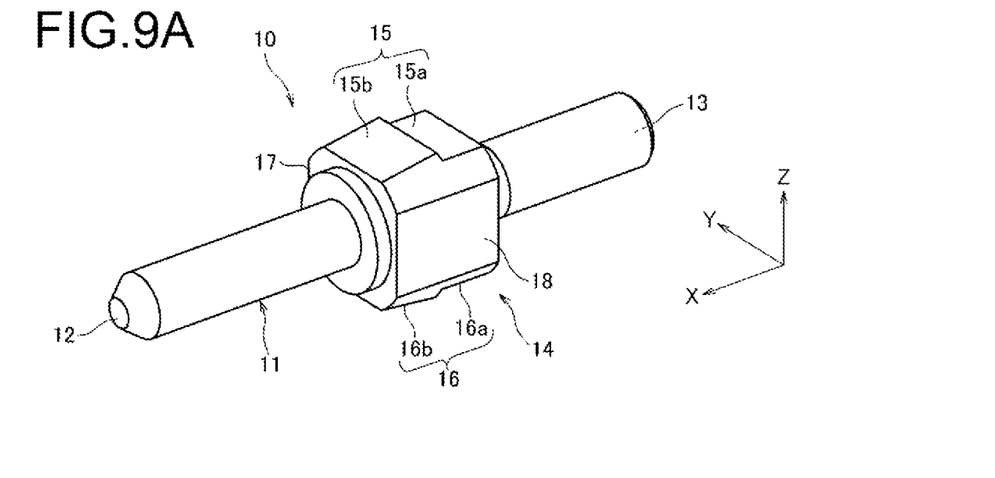
FIG. 9A is a perspective view of a ferrule according to another embodiment.
Figure 9B:
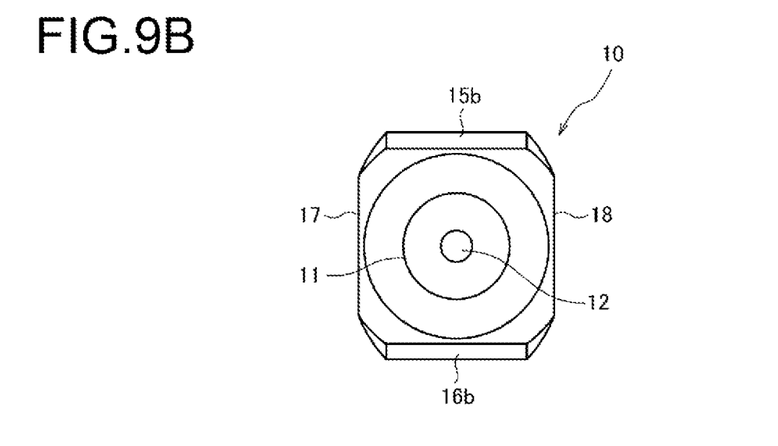
FIG. 9B is a front view of the ferrule according to the other embodiment.

As shown in FIGS. 9A and 9B, for example, the upper surface 15 of the flange 14 of the ferrule 10 has a flat surface 15a and a first tapered surface 15b on a biasing direction side with respect to the flat surface 15a. Similarly to the upper surface 15, the lower surface 16 of the flange 14 of the ferrule 10 has a flat surface 16a and a second tapered surface 16b on the biasing direction side with respect to the flat surface 16a.

The flat surface 15 and the flat surface 16 face each other with the optical axis of the optical fiber F interposed therebetween, and are parallel to each other at a predetermined distance in the Z-axis direction shown in the drawing. The first tapered surface 15b and the second tapered surface 16b face each other with the optical axis interposed therebetween, and a distance between the first tapered surface 15b and the optical axis and a distance between the second tapered surface 16b and the optical axis decrease toward the biasing direction. A distance in the Z-axis direction between a rear end of the first tapered surface 15b and a rear end of the second tapered surface 16b is larger than a distance in the Z-axis direction between the flat surface 15a and the flat surface 16a.

[Plug Frame]

Figure 10A:
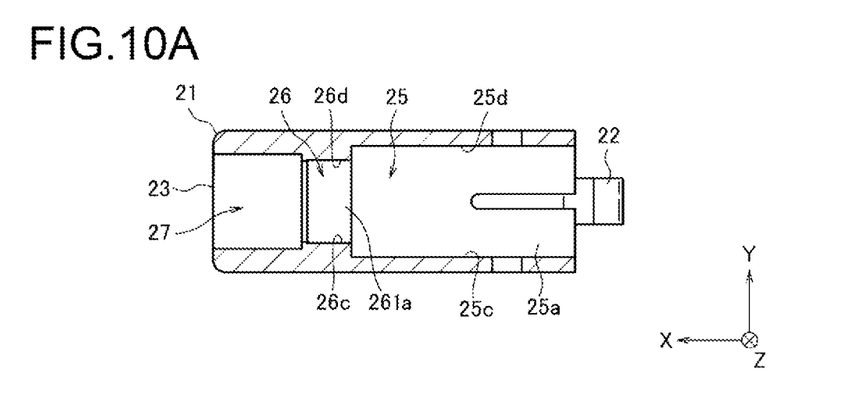
FIG. 10A is a plan sectional view of a front housing according to the other embodiment.
Figure 10B:
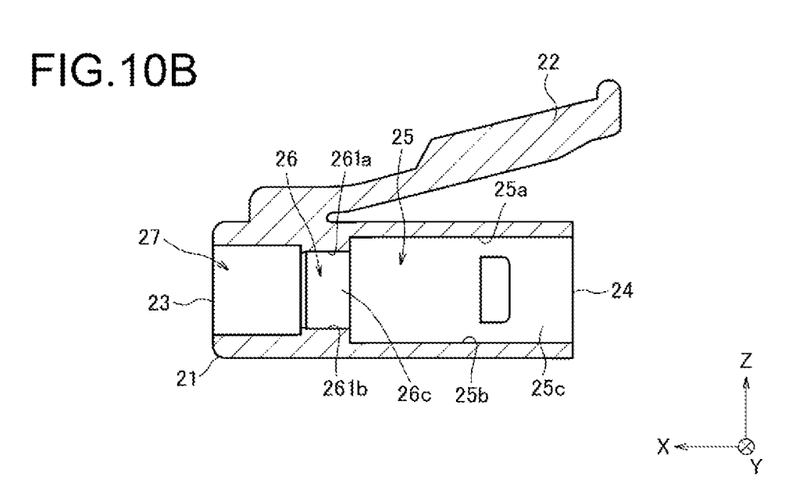
FIG. 10B is a side sectional view of the front housing according to the other embodiment.

In addition, in the above embodiment, an example in which the pivotal movement restricting portion 26 of the front housing 21 has the tapered surfaces (the first tapered surface 26a and the second tapered surface 26b) is described, but in the present embodiment, the tapered surface is on the ferrule 10 side, so that the front housing 21 has a flat surface instead of the tapered surface. Specifically, as shown in FIGS. 10A and 10B, the pivotal movement restricting portion 26 has an upper surface 261a, a lower surface 261b, a left side surface 26c, and a right side surface 26d. The upper surface 261a and the lower surface 261b are parallel to each other at a predetermined distance in the Z-axis direction shown in the drawing, and the left side surface 25c and the right side surface 25d are parallel to each other at a predetermined distance in the Y-axis direction shown in the drawing. A distance in the Z-axis direction between the upper surface 261a and the lower surface 261b is larger than a distance in the Z-axis direction between a front end of the first tapered surface 26a and a front end of the second tapered surface 26b, and is smaller than a distance in the Z-axis direction between the rear end of the first tapered surface 26a and the rear end of the second tapered surface 26b.

In this way, since the distance in the Z-axis direction between the first tapered surface 26a and the second tapered surface 26b is gradually reduced from the rear end toward the front end, the ferrule 10 can be easily inserted from the rear of the front housing 21, and the ferrule 10 can be easily positioned with respect to the front housing 21.

It should be understood that the embodiments disclosed herein are merely illustrated in all respect and not restrictive. The scope of the present disclosure is defined by the claims rather than the meaning described above, and is intended to include all modifications within the scope and meaning equivalent to the claims.

What is claimed is:

1. An optical connector comprising:
    a ferrule provided with a flange on an outside, having a through hole on an inside, and configured to hold an optical fiber containing a glass fiber and a resin coating covering the glass fiber in the through hole, the glass fiber being exposed from the resin coating at one end portion of the optical fiber;
    a plug frame configured to receive the ferrule; and
    an elastic member configured to bias the ferrule along a central axis direction of the ferrule,
    wherein the elastic member is configured to hold, when the elastic member has a first length, the ferrule in a first position in the plug frame, and hold, when the elastic member has a second length shorter than the first length, the ferrule in a second position in the plug frame,
    wherein either one of the ferrule or the plug frame has at least one tapered surface whose distance to a central axis of the ferrule decreases toward a biasing direction of the elastic member,
    wherein when the ferrule is in the first position, the ferrule and the plug frame are in contact with each other via the at least one tapered surface, and pivotal movement of the ferrule with respect to the plug frame is restricted, and
    wherein when the ferrule is in the second position, the ferrule is not in contact with the plug frame and is pivotable with respect to the plug frame, and the ferrule is in a floating state with respect to the plug frame.

2. The optical connector according to claim 1,
    wherein the at least one tapered surface includes a first tapered surface and a second tapered surface, and
    wherein the first tapered surface and the second tapered surface are configured to face each other so that the central axis of the ferrule is interposed therebetween.

3. The optical connector according to claim 1,
    wherein the flange of the ferrule has a polygonal shape in a cross-sectional view.

4. The optical connector according to claim 1,
    wherein the flange of the ferrule has a quadrangular shape in a cross-sectional view.

5. The optical connector according to claim 1,
    wherein the ferrule is made of zirconia.

6. An optical connection structure comprising:
    an optical connector assembly including the optical connector according to claim 1 and the optical fiber assembled in the optical connector; and
    a connection object coupled to the optical connector assembly via a sleeve,
    the optical fiber and an optical fiber in the connection object being optically connected to each other, and
    wherein when the ferrule is inserted into the sleeve and the ferrule is in the second position, the ferrule is in a floating state with respect to the plug frame.

7. The optical connector according to claim 6,
    wherein the optical fiber is any one of a multicore fiber, a polarization maintaining fiber, and a bundle fiber.

* * * * *